United States Patent
Van Bommel et al.

(10) Patent No.: US 9,845,921 B2
(45) Date of Patent: Dec. 19, 2017

(54) GLOWING LUMINAIRE HOUSING WITH PHOSPHOR

(75) Inventors: Ties Van Bommel, Horst (NL); Rifat Ata Mustafa Hikmet, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 435 days.

(21) Appl. No.: 14/131,462

(22) PCT Filed: Jul. 31, 2012

(86) PCT No.: PCT/IB2012/053912
§ 371 (c)(1),
(2), (4) Date: Jan. 8, 2014

(87) PCT Pub. No.: WO2013/008221
PCT Pub. Date: Jan. 17, 2013

(65) Prior Publication Data
US 2014/0140096 A1   May 22, 2014

Related U.S. Application Data

(60) Provisional application No. 61/505,636, filed on Jul. 8, 2011.

(51) Int. Cl.
*F21K 2/00*    (2006.01)
*F21V 3/04*    (2006.01)
(Continued)

(52) U.S. Cl.
CPC .............. *F21K 2/00* (2013.01); *F21V 3/0463* (2013.01); *F21V 5/04* (2013.01); *F21V 7/0091* (2013.01);
(Continued)

(58) Field of Classification Search
CPC . F21V 9/16; F21V 3/0463; F21V 5/04; F21V 7/0091; G01N 21/648; G01N 21/76; G01N 2201/0612; G01N 2201/062; G01N 27/44721; G01N 2021/7786; G01N 21/6458; F21Y 2101/02; F21Y 2115/10; G02B 6/0073; G02B 6/0003; G02B 6/0023; G02B 6/0011; H01L 33/50; H01L 33/502; H01L 2224/49107; H05B 33/14; H05B 33/145; A61N 2005/0653; F21K 9/52; F21K 9/56; F21K 9/00; F21K 2/00; G02F 1/133615; G02F 1/133621; G02F 2001/133614; G02F 2/004; G09F 13/04; G09F 13/20; G09F 13/22
See application file for complete search history.

(56) References Cited

U.S. PATENT DOCUMENTS 7,548,670 B2    6/2009  Ijzerman et al.
7,737,623 B2 *  6/2010  Kaneda ............... H01L 33/504
                                                            313/503
(Continued)

FOREIGN PATENT DOCUMENTS

DE    20317403 U1    1/2004
EP    1033530 A2     9/2000
(Continued)

*Primary Examiner* — Stephen F Husar (57) ABSTRACT

The invention provides a lighting unit (100) comprising a housing (120) including a light source (110). The light source (110) is configured to provide light source light (111) through a light exit part (121) of the housing (120). The lighting unit (100) further comprises a light interception part (130) configured to intercept part of the light source light (111) as intercepted light source light (112), and a luminescent material (140) configured to convert at least part of the intercepted light source light (112) into luminescent material light (141). The housing (120) further comprises a light emitting part (150), configured to allow the luminescent material light (141) escape from the housing (120).

17 Claims, 9 Drawing Sheets

(51) Int. Cl.
 F21V 5/04 (2006.01)
 F21V 7/00 (2006.01)
 F21V 8/00 (2006.01)
 F21Y 115/10 (2016.01)

(52) U.S. Cl.
 CPC ......... G02B 6/0011 (2013.01); *F21Y 2115/10* (2016.08)

(56) References Cited

U.S. PATENT DOCUMENTS

| | | | |
|---|---|---|---|
| 7,942,540 B2 * | 5/2011 | Harbers | ............ F21K 9/54 362/247 |
| 2003/0007348 A1 | 1/2003 | Loga et al. | |
| 2004/0145910 A1 | 7/2004 | Lisowski | |
| 2007/0274081 A1 | 11/2007 | Engel | |
| 2008/0310158 A1 | 12/2008 | Harbers et al. | |
| 2008/0310159 A1 | 12/2008 | Chinniah et al. | |
| 2009/0103293 A1 | 4/2009 | Harbers et al. | |
| 2010/0124243 A1 | 5/2010 | Hussell | |

FOREIGN PATENT DOCUMENTS

| | | | |
|---|---|---|---|
| EP | 1669664 A2 | 6/2006 | |
| JP | 2004311162 A | 4/2003 | |
| JP | 2008021561 A | 1/2008 | |
| JP | 2008028181 A | 2/2008 | |
| JP | 2010514209 A | 4/2010 | |
| JP | 2011522372 A | 7/2011 | |
| JP | 2012509578 A | 4/2012 | |
| WO | 2007069185 A1 | 6/2007 | |
| WO | 2009144668 A1 | 12/2009 | |
| WO | 2010109381 A1 | 9/2010 | |

* cited by examiner

GLOWING LUMINAIRE HOUSING WITH PHOSPHOR

FIELD OF THE INVENTION

The invention relates to a lighting unit comprising a housing including a light source, as well as to a method for providing color or glow to such housing.

BACKGROUND OF THE INVENTION

All kind of luminaires are known in the art. Some examples, chosen out of the large number of different types of luminaires, are given below.

WO2009144668 describes an illumination device comprising a lighting unit. The lighting unit comprises a light source and a substantially flat collimator, arranged to collimate light source light. The collimator has an entrance window, an edge window, a top collimator surface, a bottom collimator surface, a first collimating side edge and a second collimating side edge. The lighting unit has an optical axis. One or more of the top collimator surface, the bottom collimator surface, the first collimating side edge and the second collimating side edge comprise $n*\frac{1}{2}$ grooves, wherein n is a positive integer number, and wherein the grooves independently have a longitudinal axis having a groove direction angle ($\omega$) with the optical axis (O) $\geq 0°$ and $<90°$. Especially, one or more of the top collimator surface and the bottom collimator surface comprise a plurality of grooves, which may virtually converge at a position coinciding with the light source.

WO2007069185 describes a lamp assembly for illuminating a surface comprising a chamber accommodating a plurality of light-emitting diodes capable of emitting visible light. The lamp assembly comprises diffusing means capable of diffusing said visible light of said light-emitting diodes to produce diffuse light, and said chamber further accommodates collimation means arranged to collimate at least a portion of said diffused light for illuminating said surface. The lamp assembly is especially suitable for ambiance and atmosphere lighting applications.

SUMMARY OF THE INVENTION

It is an aspect of the invention to provide an alternative luminaire or lighting system, which has in addition to the ability to provide light, a colored housing which preferably may give colored light ('glowing effect") when the lighting system is switched on but which may preferably also be colored when the lighting system is in the off-state.

In a first aspect, the invention provides a lighting unit (or luminaire) comprising a housing including a light source (especially a light emitting diode light source), wherein the light source is configured to provide light source light through a light exit part of the housing, wherein the lighting unit further comprises a light interception part configured to intercept part of the light source light as intercepted light source light, and a luminescent material, e.g. organic and/or inorganic luminescent materials, quantum dots, nanocrystals, etc., configured to convert at least part of the intercepted light source light into luminescent material light, and wherein the housing further comprises a light emitting part, configured to allow the luminescent material light escape from the housing.

In yet a further aspect, the invention provides a method for providing color to a housing of a lighting unit comprising a light source configured to provide light source light, such as the lighting unit as (further) described herein, wherein the method comprises providing light source light (from the light source) through a light exit part of the housing, intercepting within the lighting unit part of the light source light, converting at least part of the thus obtained intercepted light source light with a luminescent material into luminescent material light, and allowing the luminescent material light escape from a light emitting part of the housing.

With such lighting unit and/or which such method, the invention provides the possibility of providing a lighting unit or luminaire which gives light, such as white light, through the light exit part (i.e. the light source light), and which lighting unit has a housing of which at least part has a colored appearance in the on-state and optionally also in the off-state. When in the on-state, the housing may have a bright colored appearance ("glowing"), due to the fact that the luminescent material provides luminescent material light (i.e. intercepted light source light that has been converted by the luminescent material) that escapes from the housing at the light emitting part. For this reason, the lighting unit may also be called a "glowing luminaire".

The light exit part and the light emitting part are thus different items of the lighting unit. The former is configured to allow the non-intercepted light escape from the lighting unit to provide thereby lighting unit light. This light may for instance be white light that may in an embodiment be applied for one or more of general lighting, target lighting, spot lighting, etc. This light exit part may for instance be an opening in the housing, such as a reflector opening or the front of a total internal reflection unit (see also below), such as a collimator of transparent material like PMMA, PMS, etc.

The light emissive part may be a part of the housing, is arranged elsewhere in the housing (than the light exit part; although these parts may in an embodiment be neighboring), and is in general a transparent material. From this light emissive part converted light may escape. For instance, the light emissive part may comprise a transparent material like PMMA, PMS, etc. wherein luminescent material is embedded.

Hence, when the luminescent material is colored, even in the off-state of the light source (lighting unit) part (i.e. the light emitting part) of the housing may be colored. The term "light emitting part", as will be clear to the person skilled in the art, especially refers to the situation wherein the lighting unit is in the on-state, and luminescence escapes from the light emitting part. However, the lighting unit in the off-state is also part of the invention, though in the off-state, in may not be emitting.

Therefore, in the on-state, at two different parts of the lighting unit, the light exit part and the light emitting part, light escapes from the lighting unit. Light escaping from the light exit part may mainly have a lighting/illumination purpose, whereas light escaping from the light emitting part may mainly have a housing glowing function.

The term "light exit part" and "light emission part" may in embodiments also refer to a plurality of light exit parts or a plurality of light emission parts, respectively.

As can be perceived from above, especially the luminescent material is a colored material configured to provide color to the light emitting part of the housing in the off-state of the light source; even more especially, the luminescent material comprises an organic luminescent material. Organic luminescent materials may be cheap and efficient materials.

Hence, in specific embodiment, the light emitting part comprises a transmissive material (see for instance above examples), wherein luminescent material is embedded (e.g. molecularly dissolved).

The term "luminescent material" may in an embodiment refer to a plurality of different luminescent materials. The luminescent material may comprise one or more selected of the group consisting of an inorganic luminescent material and an organic luminescent material. In an embodiment, the luminescent material may comprise quantum dots. However, especially the luminescent material may comprise (colored) organic luminescent material. Examples of luminescent materials are luminescent materials based on Perylene derivatives, which are for instance sold under the name Lumogen by BASF. Examples of Lumogens include, but are not limited to, Red f305, Orange f240, Yellow f083, f170, etc. Quantum dots and Quantum Rods may be based on CdSe, CdS or InP.

Examples of inorganic luminescent materials (see also below) may include, but are not limited to, Ce doped YAG ($Y_3Al_5O_{12}$) or LuAG ($Lu_3Al_5O_{12}$). Ce doped YAG emits yellowish light, and Ce doped LuAG emits yellow-greenish light. Examples of other inorganic luminescent materials which emit red light may include, but are not limited to ECAS (ECAS, which is $Ca_{1-x}AlSiN_3:Eu_x$; with $0<x\le1$; especially $x\le0.2$) and BSSN (BSSNE, which is $Ba_{2-x-z}M_xSi_{5-y}AlyN_{8-y}O_y:Eu_z$ (M=Sr, Ca; $0\le x\le1$, especially $x\le0.2$; $0\le y\le4$, $0.0005\le z\le0.05$).

In an embodiment, the luminescent material may thus especially be configured to provide colored light. In this way, color may be provided to the housing. Optionally or additionally, the light exit part may comprise a color filter.

The luminescent material that converts part of the intercepted light source light is arranged remote from the light source. Hence, the luminescent material may also be indicated as "remote luminescent material" or remote "phosphor".

To obtain the result that in the on-state the light emitting part allows luminescent material light escape from the housing, the luminescent material has to be pumped with light. This light is obtained from the light source. Hence, part (thus not all) of the light source light generated by the light source is guided away and does not leave the lighting unit via the light exit part, but is guided away to the luminescent material. Hence, part of the light source light is "intercepted". Part of this intercepted light source light is converted by the luminescent material into luminescent material light, which gives at least part of the housing (i.e. the light emitting part) its colored appearance, especially in the on-state.

Herein, the term "light source" may in an embodiment also refer to a plurality of light sources. In a specific embodiment, the light source comprises a solid state light source, such as a solid state LED (light emitting device).

As indicated above, the light is configured to provide light source light through a light exit part of the housing. Hence, in an embodiment the light source is configured in the housing to provide light source light through the exit part. Herein, light is provided through the exit part to the exterior of the lighting unit.

The light source may be configured to provide white light source light. For instance, the light source may comprise a blue LED with one or more luminescent materials. The blue emitting LED together with the one or more luminescent material may provide white light. In yet another embodiment, the light source may comprise a UV LED with one or more luminescent materials. The UV emitting LED together with the one or more luminescent material may provide white light. The luminescent materials may be applied on the LED die and/or may be embedded in a LED dome. Note that the light escaping from this light source (including luminescent material) is herein indicated as light source light, of which part may be intercepted downstream of the light source. Hence, in an embodiment the light source comprises an additional light converter, wherein the light source including additional light converter are configured to provide the light source light (of which part escapes via the light exit part and of which part is intercepted at the light interception part, and of which subsequently at least part is converted by the luminescent material into luminescent material light which may at least partly escape from the light emitting part of the housing).

In an embodiment the light source may also be configured to provide colored light source light.

In a further embodiment, the light source may also be configured to provide colored light source light, and wherein additionally the lighting unit is configured to partially further convert the colored light source light, especially to provide white light. Especially, the lighting unit may further comprise an additional light converter configured to convert part of the light source light into converted light, with the lighting unit being configured to provide (both) (a) light source light and (b) converted light through the light exit part of the housing (i.e. at least part of both escape at the light exit part). The combination of light source light and converted light may in an embodiment (again) be white light. Note that in this embodiment light interception takes place downstream of the light source but upstream of the additional light converter.

The light converter may comprise a luminescent material. Again, the term "luminescent material" may in an embodiment refer to a plurality of luminescent materials. The luminescent material may comprise one or more selected of the group consisting of an inorganic luminescent material and an organic luminescent material. In an embodiment, the luminescent material may comprise quantum dots. However, especially the luminescent material used for the additional light converter may comprise inorganic luminescent material such as from the cerium doped garnet family, like $Y_3Al_5O_{12}:Ce$ and related compounds where one or more of the cations or anions of $Y_3Al_5O_{12}$ are at least partly replaced as known in the art (like substitution of at least part of Y by Gd and/or by Lu, and/or substitution of at least part of Al by for instance Ga). In principle, one or more of the same luminescent materials as described above for use as luminescent material (to provide luminescent material light for escape from the light emitting part) may also be applied as (or in) the additional light converter.

The lighting unit may further comprise a beam shaping element, like for instance a reflector, like a conical reflector, or total internal reflection (TIR) optics (the latter herein simply indicated as "TIR").

Hence, in an embodiment, the lighting unit may further comprise a total internal reflection unit, having an (total internal reflection unit) entrance surface configured to receive light source light and an (total internal reflection unit) exit surface arranged downstream of the light source, configured to guide light source light in the direction of the light exit part of the lighting unit. In an embodiment, the exit surface is comprised by the light exit part. In yet another embodiment, the exit surface of the total internal reflection unit is the light exit part of the lighting unit.

In a further embodiment, the lighting unit according may further comprise a reflector configured to guide light source light in the direction of the light exit part of the lighting unit. The reflector has a reflector opening. In an embodiment, the reflector opening is comprised by the light exit part. In yet another embodiment, the reflector opening of the reflector is the light exit part of the lighting unit.

The beam shaping element may comprise one or more different redirection elements to intercept (part of) the light source light and redirect, or assist in redirecting, the intercepted light source light in the direction of the light emitting part.

In an embodiment, the lighting unit may further comprise a light guide (herein also indicated as wave guide) configured to intercept part of the light source light. The light guide may (thus) be used to intercept part of the light source light and guide the intercepted light source light in the direction of the light emitting part, where it will after conversion by the luminescent material at least partially escape from the housing (which may give the glowing appearance to (part of) the housing). In a further embodiment, the exit part of the lighting unit may comprise an exit plate, wherein the exit plate comprises a light guide configured to intercept part of the light source light.

In a specific embodiment, wherein TIR optics are applied, the TIR and the light guide may be a single unit or may have been assembled into a single unit. This can also be seen as a TIR with an extended exit window or exit surface.

Alternatively or additionally, the lighting unit may further comprise a redirection element at the light exit part configured to intercept part of the light source light. For instance, such redirection element may be a reflecting element, such as a curved reflector or a reflector with an angle. The redirection element may thus be applied to intercept (redirect) part of the light source light in the direction of the light emitting part of the housing. Hence, in a further embodiment, the exit part of the lighting unit may comprise an exit plate, wherein the exit plate comprises a refractive element configured to intercept part of the light source light.

In an embodiment, the exit part of the lighting unit comprises an exit plate, wherein the exit plate comprises scattering particles configured to intercept part of the light source light. Scattered light may be redirected to the light emitting part. For instance, the exit plate may be a wave guide, with at the edges of the exit part scattering particles. In such embodiment, when applying TIR optics, the TIR and the light guide are a single unit (see also above).

The exit plate herein comprises transmissive material, and allows at least part of the light source light escape from the lighting unit. In this way, the exit plate may comprise the light exit part or be the light exit part.

Above, some examples were given wherein wave guides/fibers were applied, or wherein at the exit part redirection elements are applied. However, in another embodiment, the lighting unit further comprises a beam shaping element, such as a reflector or TIR as mentioned above, wherein the beam shaping element comprises a redirection element configured to intercept part of the light source light. For instance, a reflector may comprise (small) openings in the reflector wall. Assuming TIR optics, at the edge of the TIR, outcoupling elements may be provided. Light escaping from the beam shaping element at the redirection elements may reach the luminescent material and be converted thereby in luminescent material light.

The term "redirection element" may in an embodiment also refer to a plurality of redirection elements.

The configurations described above may in general only be able to provide one type of colored housing part. It might be desired to be able to change or tune the color, for instance dependent upon the type of shop or the type of interior, etc., wherein the lighting unit is applied. For instance, a red glowing colored housing part might be changed for an orange glowing colored housing part. Hence, in a specific embodiment the light interception part may be part of a movable subunit, wherein the lighting unit further comprises a plurality of different luminescent materials, wherein lighting unit is configured to provide one or more different types of luminescent material light dependent upon the position of the movable subunit. In yet another embodiment, the lighting unit further comprises a plurality of different luminescent materials, which are integrated in a movable subunit, wherein lighting unit is configured to provide one or more different types of luminescent material light dependent upon the position of the movable subunit. The term "movable" especially indicates that part of the lighting unit may be moved with respect to other parts of the lighting unit. The movable part may for instance comprise one or more of a light guide, a light source and a luminescent material (in general not all of those three items), thereby allowing different positions, which may lead to different glowing effects, such as different colors dependent upon the position.

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DETAILED DESCRIPTION OF THE EMBODIMENTS

Figure 1A:
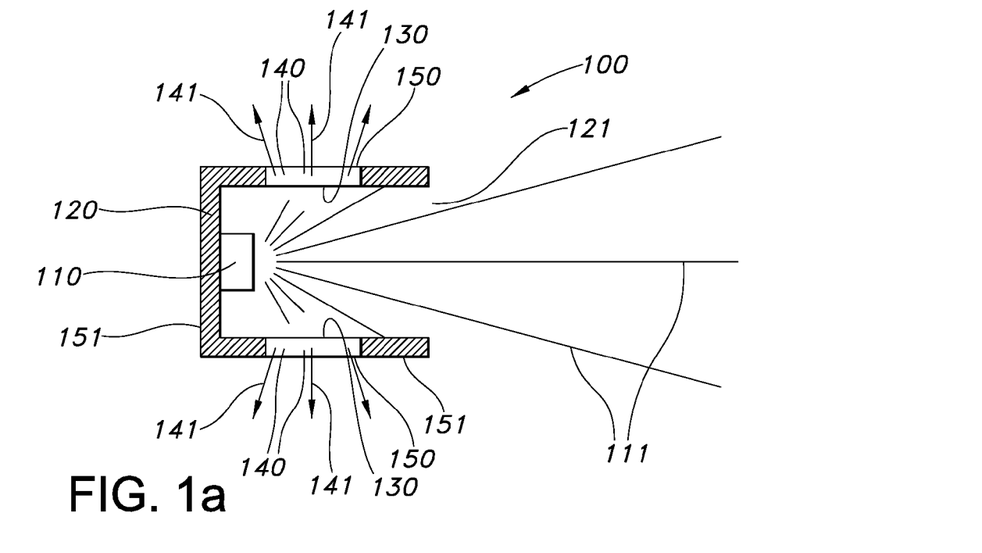
FIGS. 1a-1c schematically depict some basic embodiments of the lighting unit.

FIG. 1a schematically depicts a lighting unit 100 comprising a housing 120 including a light source 110. The light source 110, such as a white emitting LED (such as based on blue light and yellow light (converted from blue light), is configured to provide light source light 111 through a light exit part 121 of the housing 120. Hence, housing 120 comprises light exit part 121.

Figure 1B:
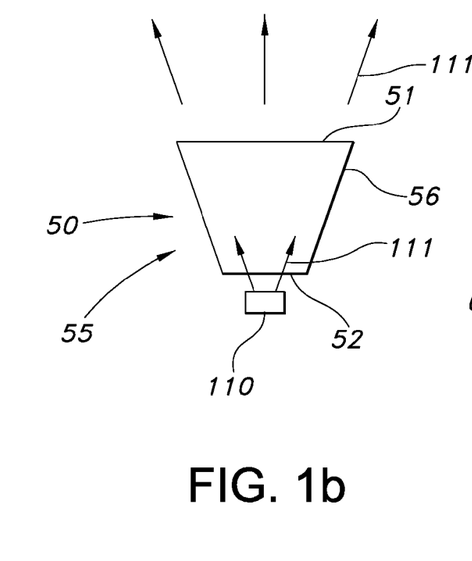
Figure 1C:
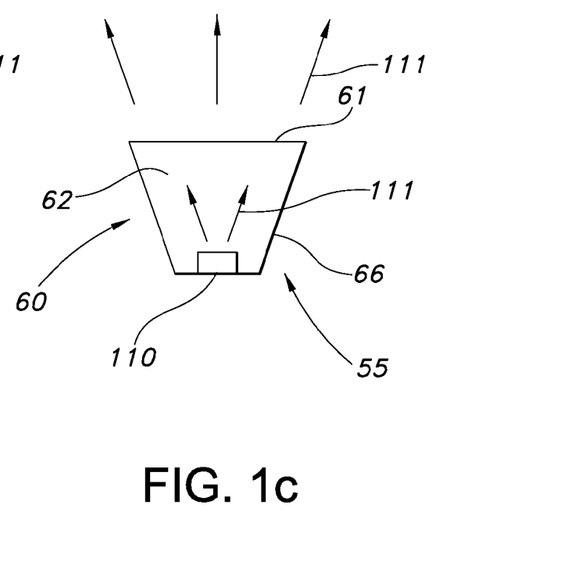

The lighting unit 100 further comprises a light interception part 130 configured to intercept part of the light source light 111 as intercepted light source light 112 (not shown in FIGS. 1a-1c; see for more detail the drawings 2a-2m). This intercepted light may be converted by a luminescent material 140. Hence, the lighting unit 100 further comprises luminescent material 140 configured to convert at least part of the intercepted light source light into luminescent material light 141. To obtain the effect that the housing 120, or at least part thereof, glows, the housing 120 further comprises a light emitting part 150 configured to allow the luminescent material light 141 escape from the housing 120. Note that not the entire house 120 necessarily glows. For instance, in addition to the light emitting part, there may also be a non-light emitting part 151. As will be clear to the person skilled in the art, the terms "light emitting part" and "non-light emitting part" may in (alternative or combined) embodiments also refer to a plurality of light emitting part and a plurality of non-light emitting parts, respectively.

Hence, the housing 120 comprises light exit part 121, light emitting part 150, and optionally non-light emitting part 151.

The lighting unit 100 may further comprise a beam shaping element 55, such as a total internal reflection optics 50 (also indicated as TIR 50), as schematically depicted in FIG. 1b, or a reflector 60, as schematically depicted in FIG. 1c.

The TIR 50 may comprise an entrance surface 52 configured to receive light source light 111 and an exit surface 51. The TIR 50 is arranged downstream of the light source 110 and may be configured to guide light source light 111 in the direction of the light exit part 121 (see further below) of the lighting unit 100. In an embodiment, see also below, the exit surface 51 coincides with the light exit part 121. Light source light 111 may be reflected at the edges 56 of the TIR 50 and in this way also be directed in the direction of the exit surface 51 of the TIR 50. The edge(s) of the TIR 50 are indicated with reference 56.

To illustrate the terms "downstream" and "upstream" (see also above): the entrance surface 52 and the exit surface 51 are both downstream of the light source 110; the entrance surface 52 is upstream of the exit surface 51 whereas the exit surface 51 is downstream of the entrance surface 52.

The reflector 60, like the TIR 50, may be configured to guide light source light 111 in the direction of the light exit part 121 of the lighting unit 100 (see also below). The reflector 60 may comprise a reflector cavity 62 and a reflector exit 61. In an embodiment, see also below, the reflector exit 61 coincides with the light exit part 121. The edge(s) of the reflector 60 are indicated with reference 66.

The TIR 50 may be a massive or hollow piece of material, whereas the reflector 60 may be a hollow (concave) mirror. Hence, in general the light source 110 will at least partly be arranged in the reflector cavity 61, whereas in case of the TIR 50, the light source 110 will in general be arranged upstream of the entrance surface 52.

Figure 2A:
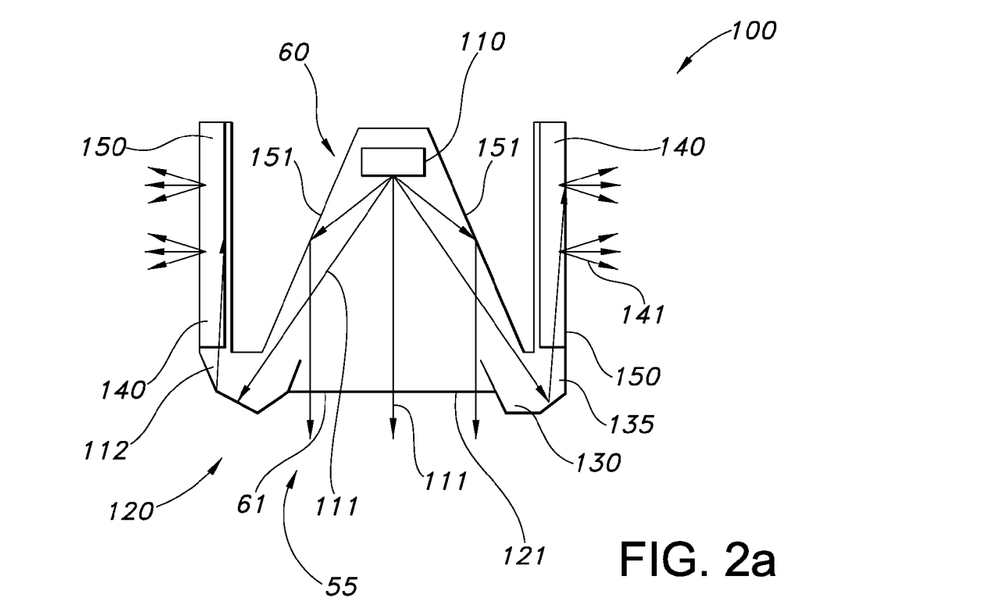
FIGS. 2a-2m schematically depicts some variations of the lighting unit.
Figure 2B:
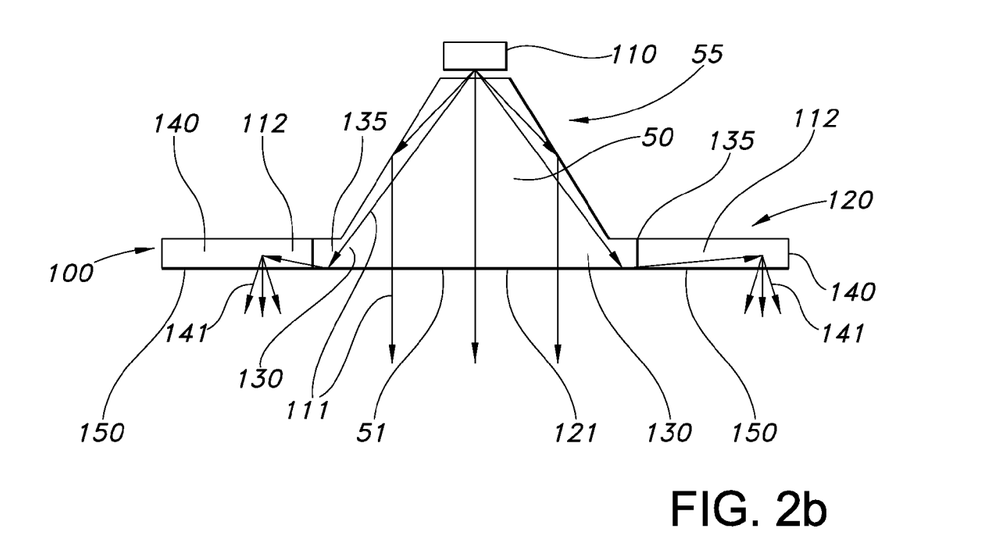

FIGS. 2a-2b schematically depict embodiments of the lighting unit 100, wherein in the former figure the lighting unit 100 comprises reflector 60 as beam shaping element 55 and wherein the latter figure, the lighting unit 100 comprises TIR 50 as beam shaping element 55. In the embodiment of FIG. 2a, the reflector exit 61 coincides with the light exit part 121. In the embodiment of FIG. 2b, the exit surface 51 of the TIR 50 coincides with the light exit part 121 of the lighting unit 100. The beam shaping element 55 may especially be configured to collimate the light source light 111 in the direction of the light exit part 121.

In both figures, light interception parts 130 are schematically depicted. For instance, these may comprise reflectors, to intercept part of the light source light 111 and redirect it to the direction of the light emitting part 150. Light source light 111 that is intercepted is indicated with reference 112. At least part of this intercepted light source light 112 is converted by the (remote) luminescent material 140 and is emitted at luminescent material light 141 from the light emitting part(s) 150.

Hence, here in an embodiment (see FIG. 2a) the use of wave guides or light guides, indicated with reference 135, is suggested, which comprises a colored luminescent material component and thus the housing has a colored appearance in the light off-state. In the light on-state light from the luminaire is partially guided into the wave guide leading to appearance of glow from the housing providing an enhanced decorative effect. Current solutions to obtain similar effect can be achieved by using OLEDs or LEDs in an additional wave guide. However, these solutions are expensive and rather complicated configurations requiring wiring and heat sinking.

In a further embodiment (see FIG. 2b) we suggest the use of LEDs together with TIR optics in which the light exit window is enlarged with a light guide 135 comprising remote luminescent material. Part of the collimated light is coupled into the light guide and converted by the organic luminescent material to another color temperature. In this way the luminaire housing shows a glowing light effect. The TIR 50 in FIG. 2b, and also some other figures, also be seen as a TIR with an extended exit window or exit surface 51.

Figure 2C:
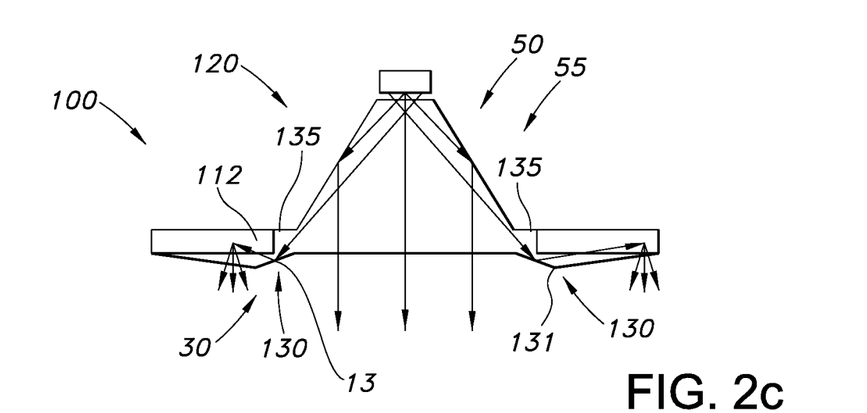
Figure 2D:
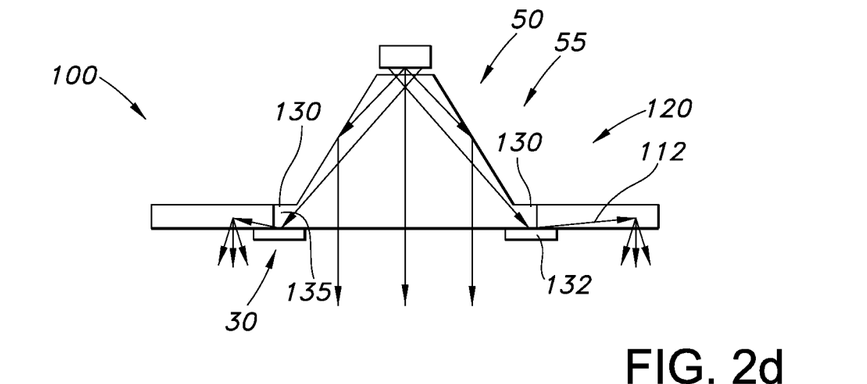
Figure 2E:
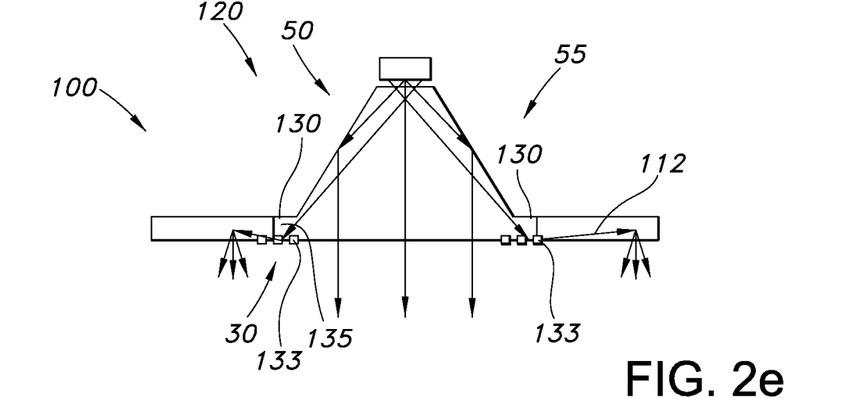

The beam shaping 55 element may comprise a redirection element 30 configured to intercept part of the light source light 111. FIG. 2c-2e schematically depict embodiments wherein the light interception parts 130 comprise (i) a shoulder shaped feature 131 (such as optionally a reflector) for increasing the amount of light source light 111 that is intercepted and redirecting it in the direction of the light emitting part 150 (FIG. 2c), (ii) a reflector 132 for increasing the amount of light source light 111 that is intercepted and redirecting it in the direction of the light emitting part 150 (FIG. 2d), and (iii) a (reflective) grating 133 for increasing the amount of light source light 111 that is intercepted and redirecting it in the direction of the light emitting part 150 (FIG. 2e), respectively. Such elements are herein also indicated as redirection elements 30. FIGS. 2c-2e especially depict the lighting unit 100 comprising TIR 50, although the same principles may apply to a reflector based lighting unit 100.

Referring to FIG. 2c, in order to improve light incoupling into the wave guide 135 it is suggested to shape the wave guide-TIR optics in such a way that more light is coupled into the wave guide part of the TIR optics by total internal reflection.

Referring to FIG. 2d, in another embodiment it is suggested to apply reflector 132 on the wave guide 135 in such a way that more light is reflected into the wave guide 135.

Referring to FIG. 2e, in the same way it is suggested to add a grating 133 on top of the wave guide 135 to increase light incoupling into the light guide 135. A grating 133 can be used to coupling in a specific color into the wave guide 135 e.g. blue LED light.

Figure 2F:
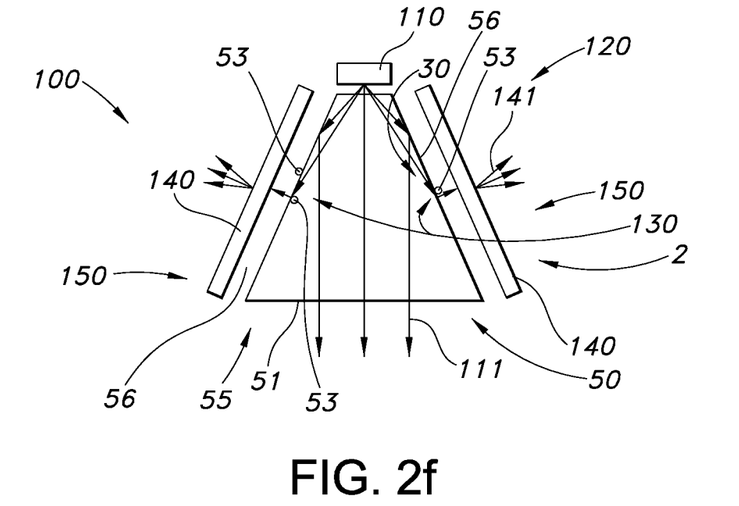

In FIGS. 2c-2e the redirection elements 30 are near the light exit part 121. However, the redirection elements 30 may also be more upstream, i.e. closer to the light source 110. FIG. 2f schematically depicts an embodiment of the lighting unit 100, wherein also TIR 50 is applied and wherein the edge 56 of the TIR 50 comprises such redirection element 30, such as an outcoupling feature. The outcoupling feature is indicated with reference 53. Herein, the term redirection element 30 and outcoupling feature 53 may in embodiments also refer to a plurality of redirection elements 30 or outcoupling features 53, respectively. Hence, the luminescent material 140 in this embodiment is downstream of the outcoupling feature (s) 63.

Hence, with reference to FIG. 2f, in another embodiment it is suggested to for instance partially roughen the TIR 50 such that part of the light to be collimated is extracted form the TIR 50 and subsequently converted by the luminiare housing comprising remote luminescent material.

In another embodiment, the (glowing) housing may partially be in contact with the TIR optics such that part of the light to be collimated is extracted form the TIR and subsequently converted by the luminiare housing comprising remote luminescent material. The contacting part should preferably be made of a material which can make optical contact with the TIR optics like e.g. a transparent material (rubber) such as polydimethylsiloxane (PDMS).

Figure 2G:
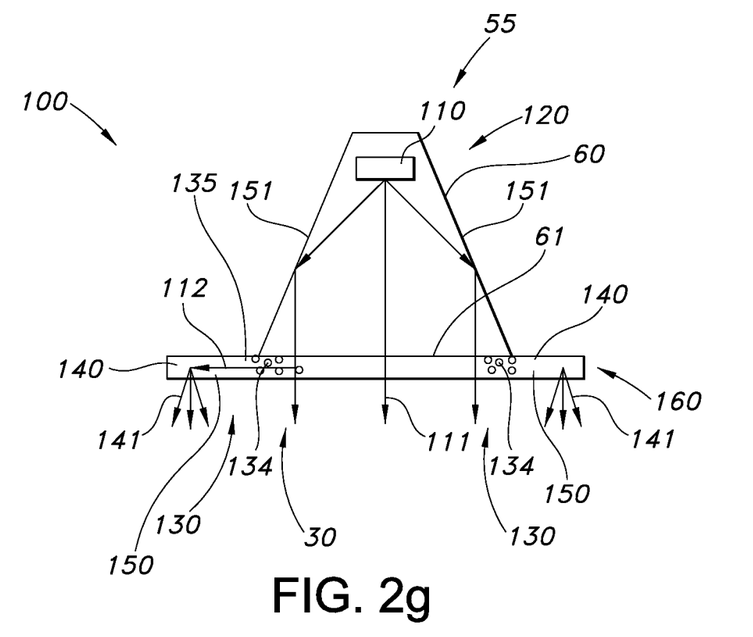

FIG. 2g schematically depicts an embodiment of the lighting unit 100 wherein the exit part 121 comprises an exit plate 160. Here, by way of example the exit plate 160 extends over the exit part 121 and may function as wave guide. The exit plate 160 is transmissive for light source light 111 and for intercepted light source light 112. The exit plate 160 further comprises scattering particles 134 (such as $Al_2O_3$, $MgO$ or $TiO_2$ particles), especially at the edge(s) of the exit part 121, configured to intercept part of the light source light 111. Note that the exit plate 160 further comprises the luminescent material 140, such as embedded organic luminescent material. The exit plate or exit window 160 may further function as part of the housing. For instance, (white) light source light 111 may escape from the exit plate, whereas elsewhere at the light emitting part(s) 150 colored luminescent material light 141 may escape from the housing 120.

With reference to FIG. 2g, in another embodiment it is suggested to add an organic remote luminescent material plate in front of the reflector 60. The luminescent material wave guide plate 160 can be designed such that sufficient light is coupled into the wave guide e.g. by incorporating locally scattering particles, structures or reflective elements, herein indicated with reference 134. These may be applied as redirection element(s) 30.

Figure 2H:
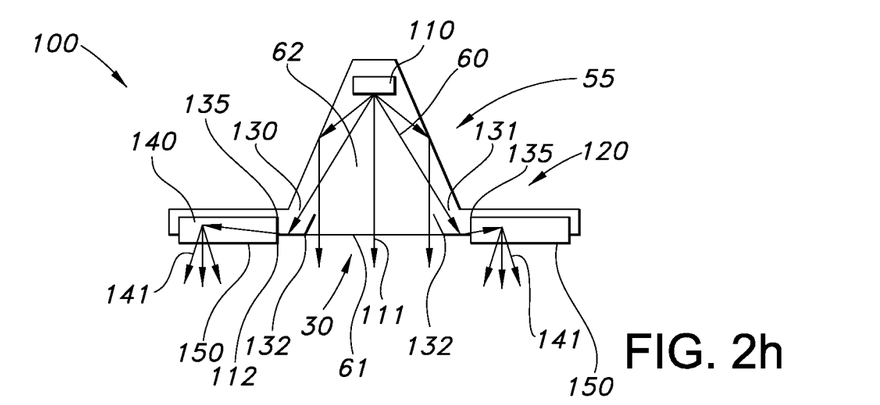

FIG. 2h is similar to FIGS. 2c and 2d. Here, in FIG. 2h, the lighting unit 100 comprises reflector 132 which has an angle. This reflector 132 is configured to intercept part of the light source light 111 and redirect it in the direction of the light emitting part 150 of the housing. After conversion by the luminescent material 140, the luminescent material light 141 escapes from the light emitting part 150.

Referring to FIG. 2h, in another embodiment we suggest a reflector 132 (redirection element(s) 30) which partly redirects light 111 into the light guide 135. The light guide 135 contains an exit window, i.e. the light emitting part 150, containing remote luminescent material 140 to convert the redirected light, i.e. the intercepted light source light 112, for decorative purposes.

Figure 2I:
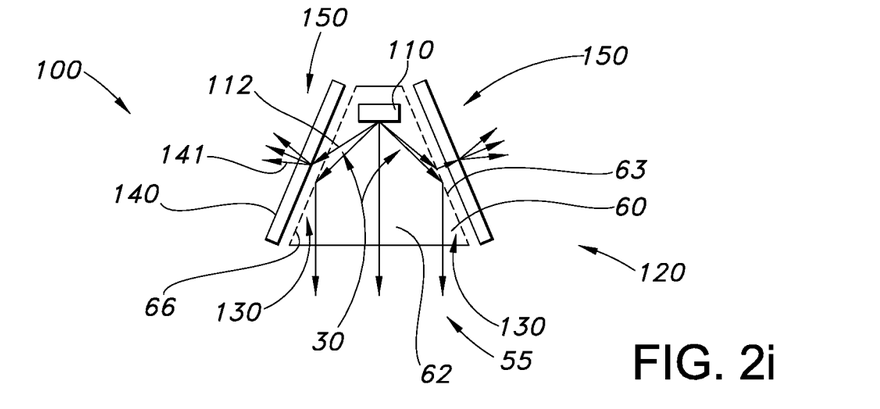

FIG. 2i is similar to FIG. 2f. However, here the lighting unit 100 comprises reflector 60 as beam shaping element 55. The reflector 60 has reflector edge(s) 66, which comprises (in this schematically depicted embodiment a plurality of) reflector perforation(s) 63 (redirection element(s) 30). These reflector perforation(s) 63 are configured to intercept part of the light source light 111 and redirect it in the direction of the light emitting part 150 of the housing. Hence, the luminescent material 140 in this embodiment is downstream of the reflector perforation(s) 63.

Hence, with reference to FIG. 2i, in another embodiment it is suggested to provide a perforated reflector 60 which partly collimates the (LED) light source light 111 while also light is partially redirected through the perforations 63 as intercepted light source light 112, to a remote luminescent material luminaire housing leading to appearance of glow from the housing 120 providing an enhanced decorative effect.

Figure 2J:
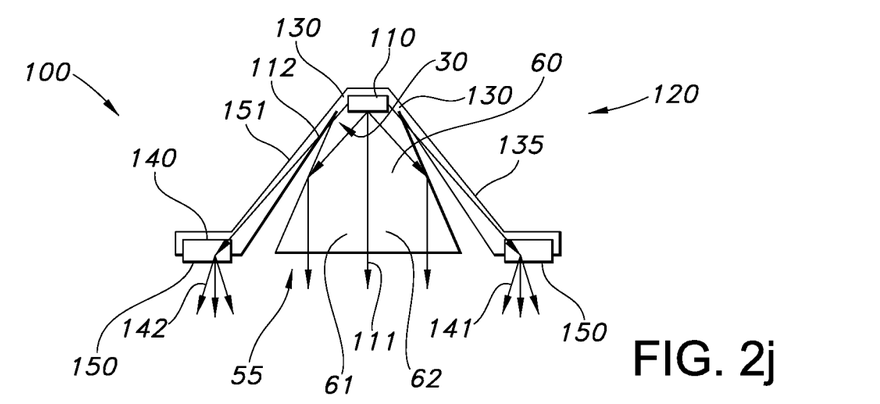

FIG. 2j schematically depicts an embodiment, wherein the lighting unit 100 comprises a light guide 135, especially being configured to intercept part of the light source light 111. Hence, the light guide 135 is part of the light interception part 130, or part of the light guide 135 functions as light interception part 130. Part of the light guide 135 may be configured not to allow light emission, and may for instance be used as non-light emitting part of the housing. For instance, the light guide 135 may be integrated in the housing 120. Part of the light guide 135 may in optical contact with the light emitting part 150 of the housing 120; or part of the light guide 135 may be the light emitting part 150. In the former, the luminescent material 140 may be incorporated in the light emitting part 150 (or may be the light emitting part 150), whereas in the latter configuration the luminescent material 140 may be incorporated in (part of) the light guide 135. However, alternative configurations are also possible.

Hence, referring to FIG. 2j, for similar purposes it is suggested in another embodiment to provide reflector 60 with a reflective light guide 135 positioned near the (LED) light source 110. Light guides may be reflective due to total internal reflection and/or due to a reflective coating.

Figures 2K, 2L, 2M:
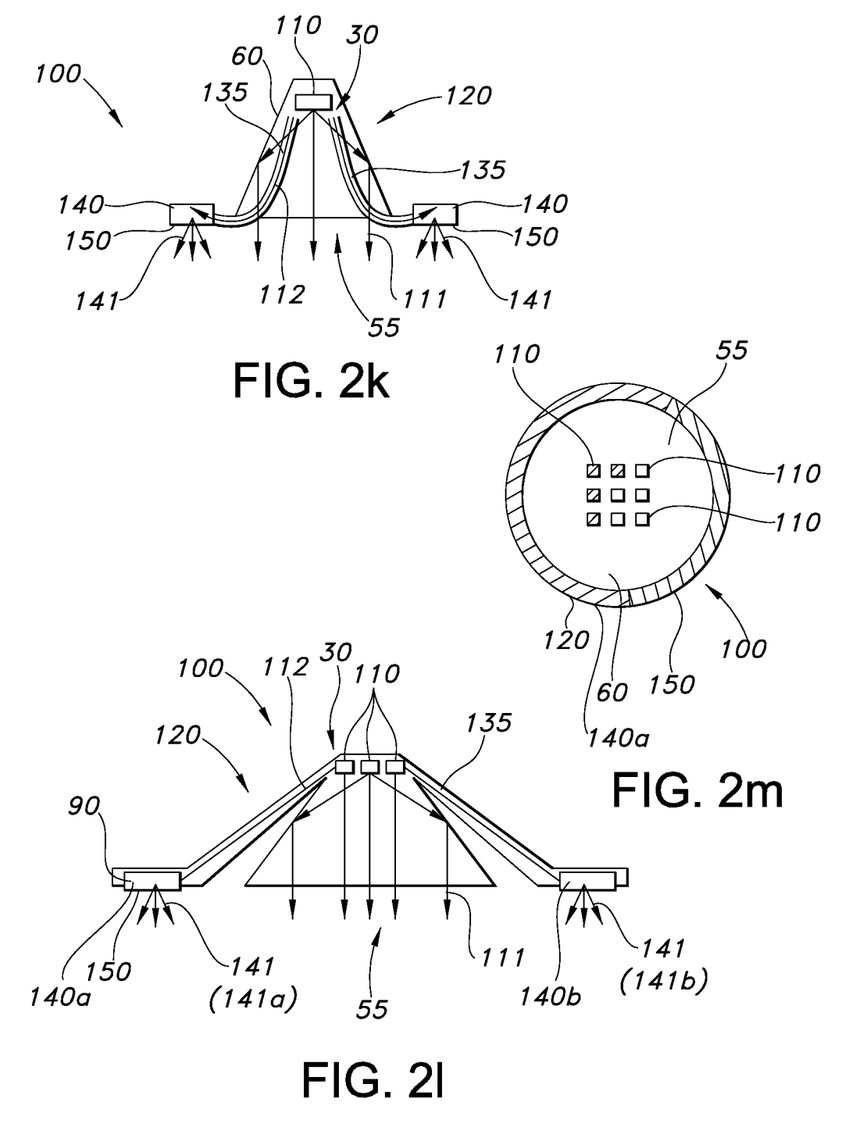

In FIG. 2j, the light guide(s) 135 can be considered as branches; in FIG. 2k, the light guides are partly comprised by the reflector 60. In the schematic FIG. 2j, part of the light guide(s) 135 is (are) enclosed by the reflector cavity 62.

Hence, with reference to FIG. 2k, in a very specific configuration, light from the (LED) light source 110 may be coupled into a wave guide 135 (or fiber) located in reflector 60. The luminescent material 140 may be positioned at the end of the wave guide (or fiber) to provide appearance of glow to the housing 120.

FIGS. 2l-2m schematically depict some variants. In FIG. 2l, the lighting unit 100 comprises a plurality of light sources 110. As indicated above, the term light source 110 may include embodiments wherein a plurality of light sources 110 is applied. Further, both figures schematically depict variants wherein different luminescent materials 140 are applied. This is indicated with by way of example references 140a and 140b, but of course more than two different luminescent materials may be applied. Here, the different luminescent materials 140 are spatially separated (i.e. not mixed as one luminescent material mixture), allowing different luminescent properties at different positions. The different types of luminescent material light 141 are indicated with references 141a and 141b. FIG. 2m schematically depicts that the luminescent material 140 may be arranged in a circle, surrounding the light exit part 121. Again, by way of example, different luminescent materials, indicated with references 140a and 140b, may be applied. Also more than two different types of luminescent materials may be applied. To indicate that two or more luminescent materials are applied, this is herein also indicated with the term "140a, 140b, . . . ".

In an embodiment, one or more of the plurality of light sources 110 may be individually addressed. In this way, optionally also the color of the light source light 111 and the luminescent material light color may be controlled.

Figure 3A:
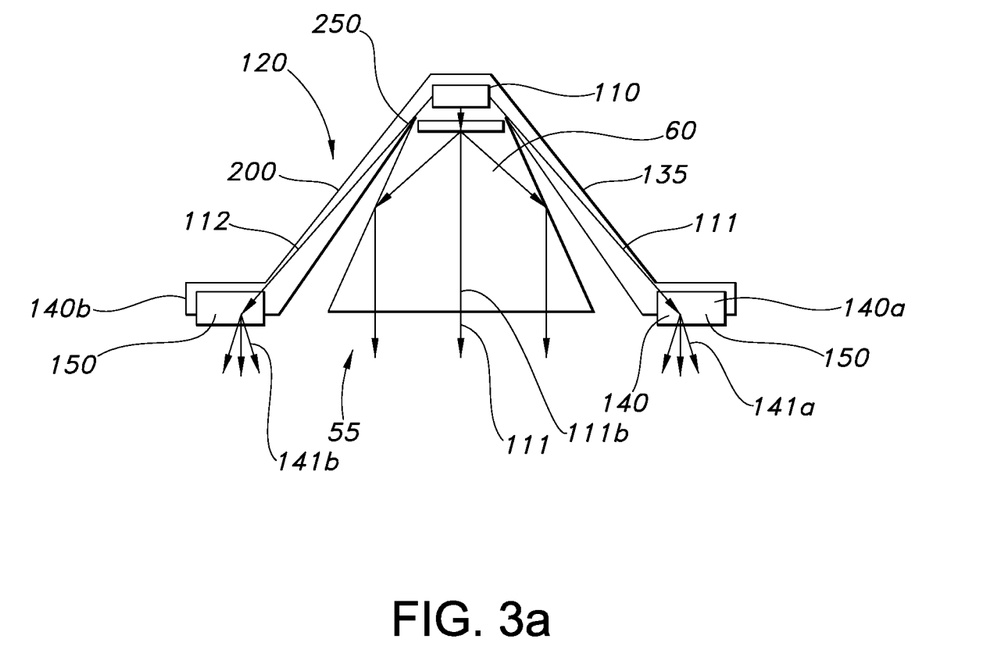
FIGS. 3a-3d schematically depict some further variants, amongst others with a movable subunit.

FIG. 3a is substantially the same as FIGS. 2j and 2l, with the exception that downstream of the light source(s) 110, an additional converter 250 is arranged. This additional converter 250 is configured to convert part of the light source light 111 into converted light 111b. Further, the lighting unit 100 is configured to provide light source light 111 and converted light 111b through the light exit part 121 of the housing 120. For instance, the light source 110 may be configured to provide blue light, of which part is absorbed by the additional converter 250 and converted into yellow light 111b. The light source light 111 remaining downstream of the additional converter together with the converted light 111b may give white light. However, also other combination of light source light 111 and converted light 111b may be provided, such as blue light as light source light 111 and green and red light as converted light 111b. Note that interception of the light source light 111 in this embodiment takes place upstream of the additional converter 250. In an embodiment, the additional converter comprises a luminescent ceramic material based on one or more family members of the cerium doped garnet family (like $Y_3Al_5O_{12}$:Ce). In yet another embodiment, it comprises a polymeric material with organic luminescent material embedded therein and/or nano particles embedded therein.

Figure 3B:
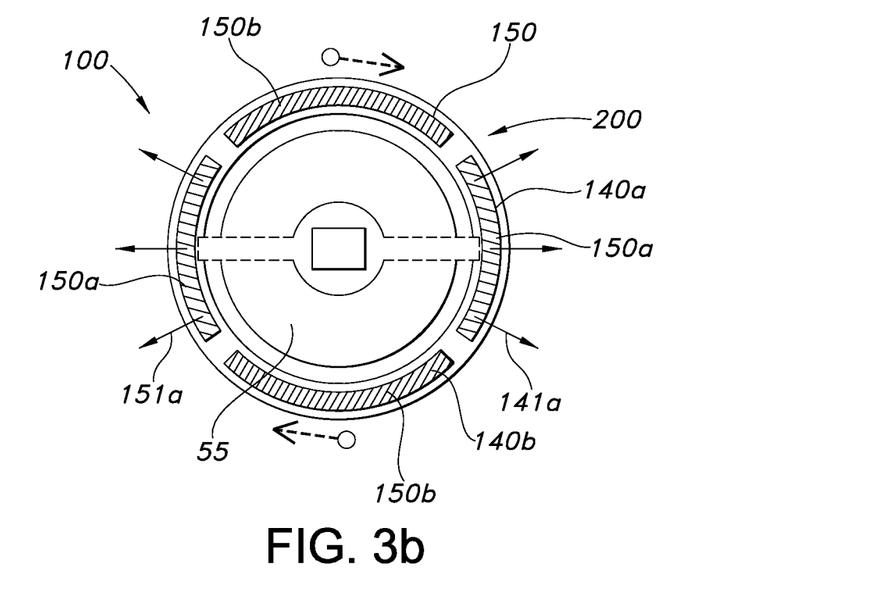
Figure 3C:
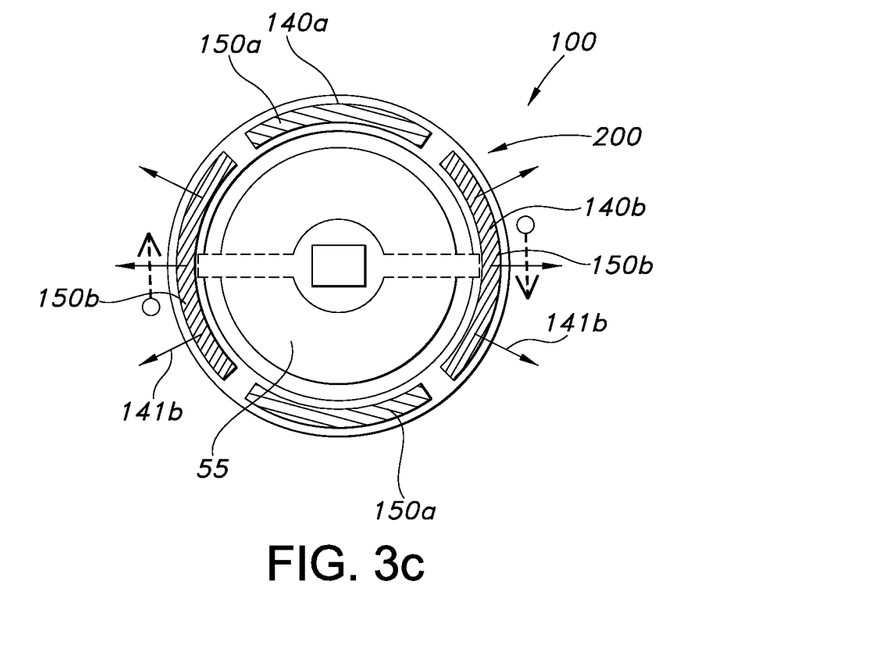
Figure 3D:
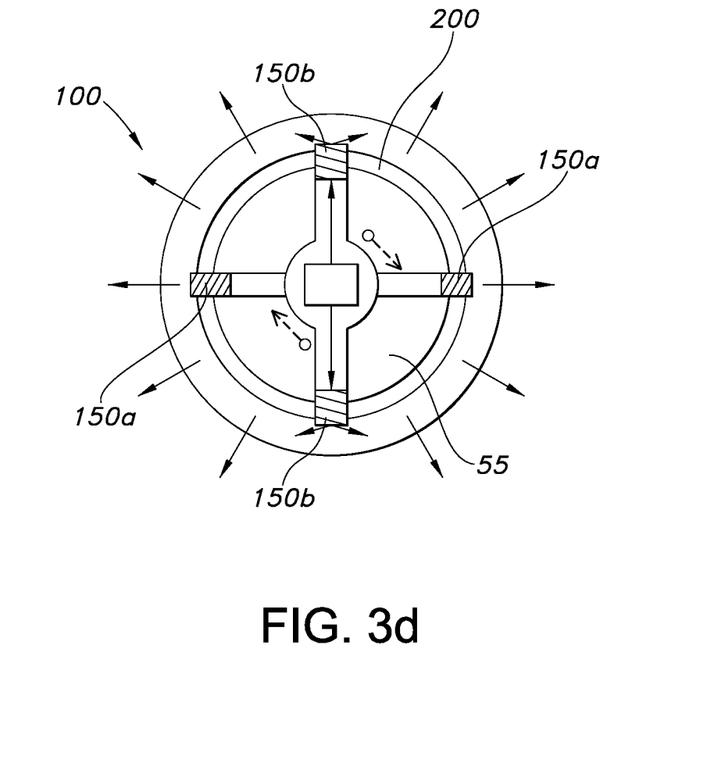

FIGS. 3b-3c and 3d schematically depict a non-limiting number of variants wherein the lighting unit 100 comprises a movable subunit 200, such as a rotatable subunit. In this way, different luminescent material 141 may be addressed, here again by way of example shown as two different luminescent material 141a and 141b, but of course, more than two different luminescent materials 141 may be applied. Here, the lighting unit 100 may for instance have the same configuration as FIG. 3a, but for instance, the different luminescent materials 140a, 140b, . . . , which are integrated in this movable subunit 200. In this way, the lighting unit 100 may be configured to provide one or more different types of luminescent material light 141 dependent upon the position of the movable subunit 200. The different types of luminescent material light 141 are herein indicated with "141a, 141b, . . . ". This implies two or more different types of luminescent material light, such as red and green. FIGS. 3b-3c schematically show how by rotation, the color may be selected. For instance, referring to FIG. 3a, the light guide(s) 135 stay in position, but the luminescent material 140 may be rotated since it is comprises in the movable subunit 200. FIG. 3d schematically depicts a further variant.

As will be clear to the person skilled in the art, all types of movements and rotations may be applied to obtain this effect. For instance, a specific embodiment (not depicted), the light interception part 130 may be part of a movable subunit 200, wherein the lighting unit 100 further comprises a plurality of different luminescent materials 140a, 140b, . . . , wherein lighting unit 100 is configured to provide one or more different types of luminescent material light 141 (i.e. 141a, 141b, . . . ) dependent upon the position of the movable subunit 200.

In the embodiments described above, part of the light source light 111 is intercepted within the lighting unit, in many embodiments even within the beam shaping element 55.

The invention claimed is:
1. A lighting unit comprising:
   a housing including a light source, wherein the light source is configured to provide light source light and wherein the housing includes a light exit part of the housing;
   a luminescent material;
   a first light interception part configured to intercept a first part of the light source light as intercepted light source light and to direct said first part of the light source light to the luminescent material, the luminescent material being configured to convert at least part of the intercepted light source light into luminescent material light;
   a second light interception part configured to intercept a second part of the light source light and to direct said second part of the light source light out of the lighting unit through said light exit part, wherein the first light interception part and the luminescent material are configured such that the luminescent material light is directed out of said lighting unit through a light emitting part that is distinct from said light exit part, wherein a third part of the light source light is directed out of said lighting unit without passing through the first or the second light interception part.

2. The lighting unit according to claim 1, wherein the luminescent material is a colored material configured to provide color to the light emitting part of the housing in the off-state of the light source.

3. The lighting unit according to claim 1, wherein the light source comprises a solid state light source.

4. The lighting unit according to claim 1, further comprising a total internal reflection unit, having an entrance surface configured to receive light source light and an exit surface arranged downstream of the light source, configured to guide light source light in the direction of the light exit part of the lighting unit.

5. The lighting unit according to claim 1, further comprising a reflector configured to guide light source light in the direction of the light exit part of the lighting unit.

6. The lighting unit according to claim 1, further comprising a light guide that is in contact with the luminescent material.

7. The lighting unit according to claim 1, further comprising a redirection element at the light exit part configured to at least partially intercept the light source light.

8. The lighting unit according to claim 1, wherein the exit part comprises an exit plate, wherein the exit plate comprises scattering particles configured to intercept part of the light source light.

9. The lighting unit according to claim 1, further comprising a beam shaping element, wherein the beam shaping element comprises a redirection element configured to at least partially intercept the light source light.

10. The lighting unit according to claim 1, further comprising a first additional light converter configured to convert part of the light source light into converted light, wherein the lighting unit is configured to provide light source light and converted light through the light exit part of the housing.

11. The lighting unit according to claim 10, wherein the light source comprises a second additional light converter to provide the light source light.

12. The lighting unit according to claim 1, wherein the first light interception part is part of a movable subunit, wherein the lighting unit further comprises a plurality of different luminescent materials, and wherein the lighting unit is configured to provide one or more different types of luminescent material light dependent upon the position of the movable subunit.

13. A method for providing color to a housing of a lighting unit comprising a light source configured to provide light source light, the method comprising:
    intercepting within the lighting unit a first part of the light source light as intercepted light source light to direct said intercepted light source light to a luminescent material;
    converting at least part of the intercepted light source light with the luminescent material into luminescent material light;
    intercepting within the lighting unit a second part of the light source light to direct said second part of the light source light out of said lighting unit through a light exit part of the housing; and
    directing the luminescent material light out of said lighting unit through a light emitting part of the housing that is distinct from the light exit part,
    directing a third part of the light source light out of said lighting unit through the light exit part of the housing unintercepted.

14. The method according to claim 13, wherein the luminescent material is a colored material configured to provide color to the light emitting part of the housing in the off-state of the light source.

15. The method according to claim 14, wherein the luminescent material comprises an organic luminescent material.

16. A lighting unit comprising:
    a housing including a light source, wherein the light source is configured to provide light source light and wherein the housing includes a light exit part of the housing;
    a luminescent material;
    a first light interception part configured to intercept a first part of the light source light as intercepted light source light and to direct said first part of the light source light to the luminescent material, the luminescent material being configured to convert at least part of the intercepted light source light into luminescent material light;
    a second light interception part configured to intercept a second part of the light source light and to direct said second part of the light source light out of the lighting unit through said light exit part, wherein the first light interception part and the luminescent material are configured such that the luminescent material light is directed out of said lighting unit through a light emitting part that is distinct from said light exit part,
    wherein the luminescent material is a colored material configured to provide color to the light emitting part of the housing in the off-state of the light source.

17. A method for providing color to a housing of a lighting unit comprising a light source configured to provide light source light, the method comprising:
    intercepting within the lighting unit a first part of the light source light as intercepted light source light to direct said intercepted light source light to a luminescent material;
    converting at least part of the intercepted light source light with the luminescent material into luminescent material light;
    intercepting within the lighting unit a second part of the light source light to direct said second part of the light source light out of said lighting unit through a light exit part of the housing; and
    directing the luminescent material light out of said lighting unit through a light emitting part of the housing that is distinct from the light exit part,
    wherein the luminescent material is a colored material configured to provide color to the light emitting part of the housing in the off-state of the light source.

* * * * *